United States Patent
Lee et al.

(10) Patent No.: US 7,690,885 B2
(45) Date of Patent: Apr. 6, 2010

(54) METHODS AND SYSTEM FOR SHIELDING COOLING AIR TO FACILITATE COOLING INTEGRAL TURBINE NOZZLE AND SHROUD ASSEMBLIES

(75) Inventors: Ching-Pang Lee, Cincinnati, OH (US); Eric Alan Estill, Morrow, OH (US); James Harvey Laflen, Loveland, OH (US); Daniel Vern Jones, Maineville, OH (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 11/565,472

(22) Filed: Nov. 30, 2006

(65) Prior Publication Data
US 2008/0131263 A1 Jun. 5, 2008

(51) Int. Cl.
*F01D 25/12* (2006.01)

(52) U.S. Cl. .......... 415/1; 415/173.1; 415/115; 415/116; 415/191; 415/199.5

(58) Field of Classification Search .......... 415/1, 415/115, 191, 199.5, 211.2, 173.1, 116
See application file for complete search history.

(56) References Cited

U.S. PATENT DOCUMENTS

| | | | |
|---|---|---|---|
| 4,522,557 A * | 6/1985 | Bouiller et al. .......... 415/115 |
| 4,949,545 A | 8/1990 | Shekleton | |
| 5,217,348 A | 6/1993 | Rup, Jr. et al. | |
| 5,407,319 A * | 4/1995 | Harrogate et al. .......... 415/115 |
| 5,511,945 A | 4/1996 | Glezer et al. | |
| 6,082,961 A * | 7/2000 | Anderson et al. .......... 415/115 |
| 6,126,390 A * | 10/2000 | Bock .......... 415/115 |
| 6,340,285 B1 | 1/2002 | Gonyou et al. | |
| 6,354,795 B1 | 3/2002 | White et al. | |
| 6,398,488 B1 | 6/2002 | Solda et al. | |
| 6,431,820 B1 | 8/2002 | Beacock et al. | |
| 6,431,832 B1 | 8/2002 | Glezer et al. | |
| 6,485,255 B1 | 11/2002 | Care et al. | |
| 6,779,597 B2 | 8/2004 | DeMarche et al. | |
| 6,984,100 B2 | 1/2006 | Bunker et al. | |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method for cooling a shroud segment of a gas turbine engine includes providing a turbine shroud assembly including a shroud segment having a leading edge defining a forward face. A turbine nozzle is coupled to the turbine shroud assembly such that a gap is defined between an aft face of an outer band of the turbine nozzle and the forward face, wherein a lip formed on the aft face is positioned radially inwardly with respect to the gap and extends substantially axially downstream from the gap. Cooling air is directed into the gap. Cooling air exiting the gap impinges against the lip. Post impingement cooling air is directed at the forward face to facilitate forming a film cooling layer on the shroud segment. The film cooling layer is shielded from combustion gases flowing through the gas turbine engine.

20 Claims, 4 Drawing Sheets

METHODS AND SYSTEM FOR SHIELDING COOLING AIR TO FACILITATE COOLING INTEGRAL TURBINE NOZZLE AND SHROUD ASSEMBLIES

STATEMENT REGARDING FEDERALLY SPONSORED RESEARCH & DEVELOPMENT

The U.S. Government may have certain rights in this invention pursuant to contract number N00019-04-C-0093.

BACKGROUND OF THE INVENTION

This invention relates generally to gas turbine engines and, more particularly, to methods and systems for cooling integral turbine nozzle and shroud assemblies.

One known approach to increase the efficiency of gas turbine engines requires raising the turbine operating temperature. However, as operating temperatures are increased, the thermal limits of certain engine components may be exceeded, resulting in reduced service life and/or material failure. Moreover, the increased thermal expansion and contraction of components may adversely affect component clearances and/or component interfitting relationships. Consequently, cooling systems have been incorporated into gas turbine engines to facilitate cooling such components to avoid potentially damaging consequences when exposed to elevated operating temperatures.

It is known to extract, from the main airstream, air from the compressor for cooling purposes. To facilitate maintaining engine operating efficiency, the volume of cooling air extracted is typically limited to only a small percentage of the total main airstream. As such, this requires that the cooling air be utilized with the utmost efficiency in order to facilitate maintaining the temperatures of components within safe limits.

For example, one component that is subjected to high temperatures is the shroud assembly located immediately downstream of the high pressure turbine nozzle extending from the combustor. The shroud assembly extends circumferentially about the rotor of the high pressure turbine and thus defines a portion of the outer boundary (flow path) of the main gas stream flowing through the high pressure turbine. Gas turbine engine efficiency may be negatively affected by a fluctuation in turbine blade clearance measured between a radially outer surface of the turbine blade and a radially inner surface of the shroud assembly. During transient engine operation, turbine blade clearance is a function of the relative radial displacements of the turbine rotor and the shroud assembly. The turbine rotor typically has a larger mass than the stationary shroud system and, thus, during turbine operation, the turbine rotor typically has a slower thermal response than the shroud assembly. When the difference in the turbine rotor radial displacement and the shroud assembly radial displacement is too great, the blade clearance is increased, which may result in a reduction in engine efficiency.

Moreover, during engine operation, a gap may be defined between a trailing edge of the high pressure turbine nozzle outer band and a leading edge of the adjacent shroud segment. Cooling air, including, without limitation, nozzle leakage and/or purge flow, enters the gap and flows into the main gas stream channeled through the high pressure turbine. More specifically, because known nozzle outer band trailing edges and shroud leading edges have a simple 90° corner, the gap opens directly into the main gas stream. During engine operation, as the main gas stream flows through the nozzle vanes, a circumferential gas pressure variation may be created downstream from the vane trailing edge. This circumferential gas pressure variation may cause localized hot gas ingestion into the gap between the outer band and the shroud segment. As a result, cooling air flowing through the gap may not effectively cool the downstream shroud segment.

BRIEF DESCRIPTION OF THE INVENTION

In one aspect, a method is provided for film cooling a shroud segment of a gas turbine engine. The method includes providing a turbine shroud assembly including a shroud segment having a leading edge defining a forward face. A turbine nozzle is coupled to the turbine shroud assembly such that a gap is defined between an aft face of an outer band of the turbine nozzle and the forward face, wherein a lip formed on the aft face is positioned radially inwardly with respect to the gap and extends substantially axially downstream from the gap. Cooling air is directed into the gap. Cooling air exiting the gap impinges against the lip. Post impingement cooling air is directed at the forward face to facilitate forming a film cooling layer on the shroud segment. The film cooling layer is shielded from combustion gases flowing through the gas turbine engine.

In a further aspect, a turbine nozzle and shroud assembly for a gas turbine engine defining a central axis is provided. The turbine nozzle and shroud assembly includes a shroud segment including a leading edge defining a forward face of the shroud segment. A turbine nozzle includes an outer band having a trailing edge defining an aft face of the outer band. The turbine nozzle is positioned upstream from the shroud segment and coupled with the shroud segment such that a gap is defined between the aft face and the forward face. The gap is configured to direct cooling air towards a hot gas flow path flowing through the gas turbine engine. The aft face includes a lip is formed thereon radially inward with respect to the gap and extending axially downstream from the gap. A plurality of discharge openings are defined in the lip. The discharge openings are configured to meter cooling air with respect to the gap.

In another aspect, a cooling system for a gas turbine engine is provided. The gas turbine engine includes a shroud segment having a leading edge defining a forward face, and a turbine nozzle including an outer band having a trailing edge defining an aft face. The turbine nozzle is positioned upstream of the shroud segment and coupled with the shroud segment such that a gap is defined between the aft face and the forward face. The aft face forms a lip radially inward with respect to the gap and extending substantially axially downstream from the gap. The cooling system is configured to direct cooling air through the gap and radially inward towards combustion gases flowing through the gas turbine engine, impinge cooling air exiting the gap against the lip to facilitate forming a film cooling layer along the shroud segment and shield the film cooling layer from combustion gases.

DETAILED DESCRIPTION OF THE INVENTION

The present invention provides a turbine shroud cooling system for film cooling a shroud segment. The turbine shroud cooling system facilitates forming a barrier between the hot gas flow path flowing through the high pressure turbine and cooling air flowing through a gap defined between the turbine nozzle and the shroud segment. More specifically, an extended lip at a trailing edge of the outer band facilitates forming the barrier between the hot gas flow path and the gap defined between an outer band of the turbine nozzle and the shroud segment. Further, the extended lip facilitates pressurizing the gap to facilitate preventing or limiting hot gas injection into the gap. In one embodiment, the extended lip forms an axial aft facing film cooling slot in parallel with a rounded corner portion of the shroud leading edge to facilitate film cooling the downstream shroud segment.

Although the present invention is described below in reference to its application in connection with cooling a shroud assembly of an aircraft gas turbine, it should be apparent to those skilled in the art and guided by the teachings herein provided that with appropriate modification, the cooling system or assembly of the present invention can also be suitable to facilitate cooling other turbine engine components, such as, but not limited to, the nozzle and/or vane sections.

Figure 1:
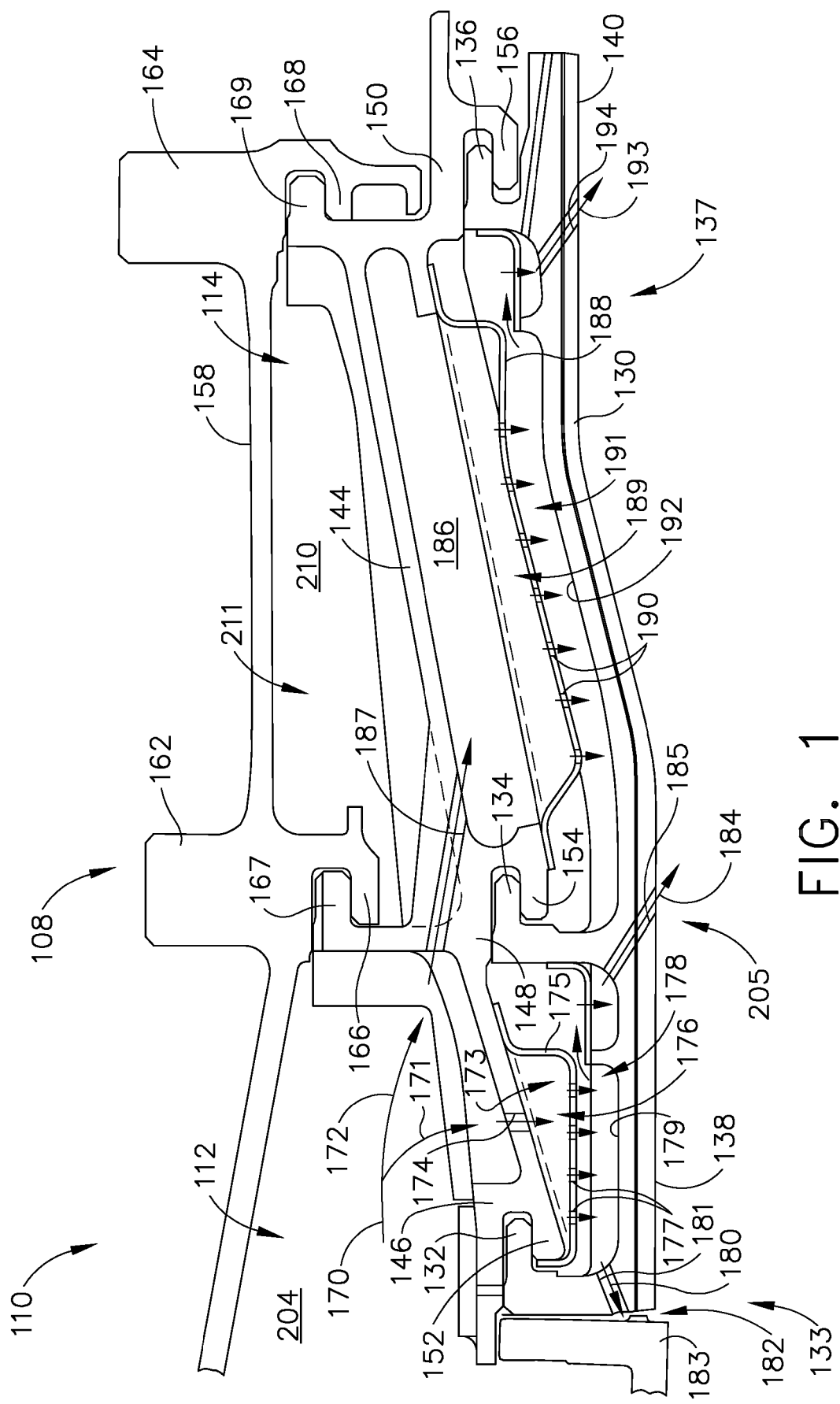
FIG. 1 is a side view of an exemplary shroud assembly schematically illustrating high pressure cooling air flow through the shroud assembly.
Figure 2:
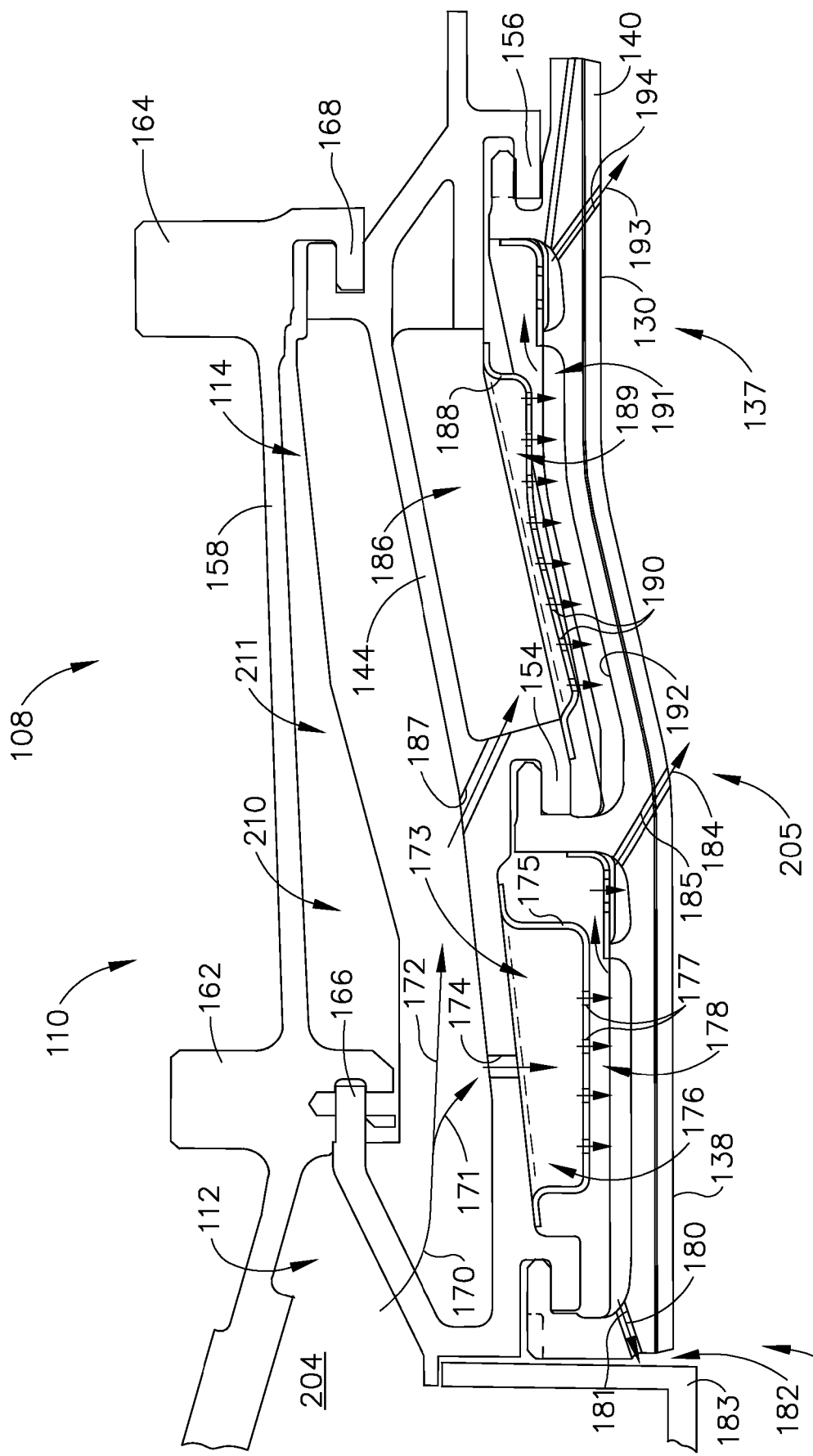
FIG. 2 is a side view of an alternative shroud assembly schematically illustrating high pressure cooling air flow through the shroud assembly.

FIG. 1 is a side view of an exemplary shroud assembly schematically illustrating high pressure cooling air flow through the shroud assembly. FIG. 2 is a side view of an alternative shroud assembly schematically illustrating high pressure cooling air flow through the shroud assembly. To facilitate controlling shroud assembly thermal response and/or shroud assembly displacement during transient engine operation, in the exemplary embodiment, a turbine engine cooling assembly 108 includes a shroud assembly, generally indicated as 110, for a high pressure turbine section 112 and a low pressure turbine section 114 of a gas turbine engine. It should be apparent to those skilled in the art and guided by the teachings herein provided that turbine engine cooling assembly 108 may be suitable to facilitate cooling other sections of the gas turbine engine, such as, but not limited to, a nozzle section and/or a vane section.

Shroud assembly 110 includes turbine engine cooling components in the form of shroud segments 130. Each shroud segment 130 includes a forward mounting hook 132 at a circumferential leading edge 133 of shroud segment 130. Shroud segment 130 also includes a midsection mounting hook 134 and an aft mounting hook 136 adjacent to a circumferential trailing edge 137 of shroud segment 130.

A plurality of shroud segments 130 are arranged circumferentially in a generally known fashion to form an annular segmented shroud. Shroud segments 130 define an annular clearance between high pressure turbine blades (not shown) and a radially inner surface 138 of a high pressure turbine section of shroud segments 130, and between low pressure turbine blades (not shown) and a radially inner surface 140 of a low pressure turbine section of shroud segment 130. A plurality of segmented shroud supports 144 interconnect shroud segments 130. Each shroud support 144 circumferentially spans and supports adjacent shroud segments 130. In alternative embodiments, shroud supports 144 are modified to support any suitable number of shroud segments 130 less than or greater than two shroud segments 130. In the exemplary embodiment, shroud assembly 110 includes twenty-six (26) shroud segments 130 and thirteen (13) shroud supports 144, although any suitable number of shroud segments 130 and/or shroud supports 144 may be utilized in alternative embodiments.

Each shroud support 144 includes a forward section 146, a midsection 148 and an aft section 150 that form respective forwardly projecting hangers 152, 154 and 156. Mounting hooks 132, 134 and 136 are received by cooperating hangers 152, 154 and 156, respectively, in tongue-in-groove, or hook-in-hanger, interconnections such that shroud support 144 supports respective shroud segments 130.

Shroud assembly 110 includes an annular shroud ring structure 158 that in turn supports shroud supports 144. In one embodiment, shroud ring structure 158 is a one-piece, continuous annular shroud ring structure. A radial position of each shroud support 144, as well as of each shroud segment 130, is closely controlled by only two annular position control rings 162 and 164 formed on shroud ring structure 158. In contrast to conventional shroud ring structures, to facilitate reducing or limiting a weight of shroud assembly 110, shroud ring structure 158 includes only two position control rings 162 and 164. A midsection position control ring 162 includes an axially forwardly projecting hanger 166 that receives and/or cooperates with a rearwardly projecting mounting hook 167 formed by support structure midsection 148 in a first circumferential tongue-in-groove or hook-in-hanger interconnection. An aft position control ring 164 includes an axially forwardly projecting hanger 168 that receives and/or cooperates with a rearwardly projecting mounting hook 169 of support structure aft section 150 in second circumferential tongue-in-groove or hook-in-hanger interconnection.

In the exemplary embodiment, hangers 166 and/or 168 are in direct axial alignment, i.e., aligned generally in the same radial plane, with respective hanger 154 and hanger 156 to facilitate maximizing the radial support and/or radial position control provided to shroud support 144 and, thus, corresponding shroud segments 130. This alignment orientation facilitates increasing the rigidity of the entire shroud support assembly. In an alternative embodiment, shown in FIG. 2, hanger 166 and/or hanger 168 are in an offset axial alignment, i.e., not aligned generally in the same radial plane, with respective hanger 154 and hanger 156. In the exemplary embodiment, shroud ring structure 158 is bolted to the combustor case (not shown) at an aft end of shroud ring structure 158. Shroud ring structure 158 is cantilevered away from leading edge 133 at the combustor case interface. As such, midsection position control ring 162 is positioned several inches away from the combustor aft flange (not shown), and is thereby divorced from any non-uniform circumferential variations in radial deflection in the combustor case.

In the exemplary embodiment, high pressure cooling air 170 is extracted from a compressor (not shown) positioned upstream of shroud assembly 110. A first portion 171 of high pressure cooling air 170 extracted from the compressor facilitates cooling high pressure turbine section 112. A second portion 172 of high pressure cooling air 170 extracted from the compressor facilitates cooling low pressure turbine section 114. Referring further to FIG. 1, directional arrows corresponding to first portion 171 and second portion 172 illustrate at least a portion of a flow path of first portion 171 of high pressure cooling air 170 through a high pressure turbine section active convection cooling zone 173 and second portion 172 of high pressure cooling air 170 through a low pressure turbine section active convection cooling zone 186 (described below), respectively.

In this embodiment, first portion 171 of high pressure cooling air 170 is metered into a first or high pressure turbine section active convection cooling zone 173. More specifically, first portion 171 of high pressure cooling air 170 is metered through at least one high pressure turbine section (HPTS) feed hole 174 defined in shroud support 144. First portion 171 of high pressure cooling air 170 impinges against a pan-shaped HPTS impingement baffle 175 positioned within high pressure turbine section active convection cooling zone 173. Baffle 175 is coupled to shroud support 144 and thus at least partially defines an upper HPTS cavity or plenum 176. First portion 171 of high pressure cooling air 170 is then metered through a plurality of perforations 177 formed in impingement baffle 175 as cooling air into a lower HPTS cavity or plenum 178 defined in shroud segment 130, wherein the cooling air impinges against a backside 179 of shroud segment 130. A portion, such as spent impingement cooling air 180, of high pressure cooling air exits plenum 178 through a plurality of forwardly directed cooling openings 181 defined at, or near, shroud segment leading edge 133 configured to facilitate purging a gap 182 defined between high pressure turbine nozzle outer band 183 and leading edge 133. A portion 184 of high pressure cooling air is metered through a plurality of rearwardly directed cooling openings 185 defined in shroud segment 130 to facilitate film cooling inner surface 138 and/or 140. Spent impingement cooling air 180 of high pressure cooling air exiting cooling openings 181 facilitates preventing or limiting hot gas injection or recirculation into shroud assembly 110 at leading edge 133.

Second portion 172 of high pressure cooling air 170 extracted from the compressor facilitates cooling low pressure turbine section 114. In this embodiment, second portion 172 of high pressure cooling air 170 is metered into a second or low pressure turbine section active convection cooling zone 186. More specifically, second portion 172 of high pressure cooling air 170 is metered through at least one low pressure turbine feed hole 187 defined in shroud support 144. Second portion 172 of high pressure cooling air 170 impinges against a pan-shaped low pressure turbine section (LPTS) impingement baffle 188 positioned within low pressure turbine section active convection cooling zone 186. Baffle 188 is coupled to shroud support 144, and thus at least partially defines an upper LPTS cavity or plenum 189. Second portion 172 of high pressure cooling air 170 is then metered through perforations 190 defined in impingement baffle 188 and into a lower LPTS cavity or plenum 191 wherein high pressure cooling air impinges against a backside 192 of shroud segment 130. Cooling air 193 exits plenum 191 through a plurality of rearwardly directed cooling openings 194 defined through shroud segment 130, to facilitate film cooling radially inner surface 140 of trailing edge 137 of shroud segment 130 downstream.

As shown in FIG. 1, high pressure cooling air 170 is initially directed into a duct 204 defined at least partially between high pressure turbine nozzle outer band 183 and the portion of shroud ring structure 158 forming midsection position control ring 162. High pressure cooling air 170 is separated within duct 204 into first portion 171, and into second portion 172, as high pressure cooling air 170 is directed through duct 204. First portion 171 of high pressure cooling air 170 is metered through HPTS feed holes 174 into active convection cooling zone 173 and into plenum 178 to facilitate impingement cooling in high pressure turbine section 112. Spent impingement cooling air 180 exits shroud segment 130 through shroud segment leading edge cooling openings 181 to facilitate purging gap 182 defined between high pressure turbine nozzle outer band 183 and shroud segment 130, and/or through cooling openings 185 defined at a trailing end 205 of high pressure turbine section 112 to facilitate film cooling inner surface 138 and/or 140 of shroud segment 130.

Second portion 172 of high pressure cooling air 170 is directed into second active convection cooling zone 186 that is defined at least partially between shroud support 144 and shroud segment 130, and between midsection position control ring 162 and aft position control ring 164. Second portion 172 of high pressure cooling air 170 facilitates cooling low pressure turbine section 114. In one embodiment, second portion 172 of high pressure cooling air 170 is metered through a plurality of low pressure turbine feed holes 187 defined in shroud support 144. More specifically, second portion 172 of high pressure cooling air 170 is metered directly into active convection cooling zone 186 to facilitate shroud segment impingement cooling in low pressure turbine section 114, such that cooling air bypasses a third region 210 defining an inactive convection cooling zone 211 between shroud support 144 and shroud ring structure 158, and between midsection position control ring 162 and aft position control ring 164. Spent impingement cooling air exits shroud segment 130 through cooling openings 194 defined at or near trailing edge 137 of shroud segment 130.

In the flow path illustrated in FIG. 1, high pressure turbine section active convection cooling zone 173 and/or low pressure turbine section active convection cooling zone 186 are directly and actively cooled. Low pressure turbine section inactive convection cooling zone 211 is inactive, i.e., no high pressure cooling air flows through inactive convection cooling zone 211. Thus, a thermal response within inactive convection cooling zone 211 to environmental conditions created during transient engine operation is reduced and/or retarded. As a result, transient displacement of midsection position control ring 162 and/or aft position control ring 164 is also reduced and/or retarded.

In the alternative embodiment shown in FIG. 2, high pressure cooling air 170 is directed into duct 204 defined at least partially between high pressure turbine nozzle outer band 183 and shroud ring structure 158 forming midsection position control ring 162. High pressure cooling air 170 is separated into first portion 171 and second portion 172. First portion 171 of high pressure cooling air 170 is metered through HPTS feed hole(s) 174 into high pressure turbine section active convection cooling zone 173 at least partially defining plenum 176 and plenum 178 to facilitate shroud segment impingement cooling in high pressure turbine section 112. Spent impingement cooling air 180 exits shroud segment 130 through shroud segment leading edge cooling openings 181 to facilitate purging gap 182 between high pressure turbine nozzle outer band 183 and shroud segment 130 and/or through cooling openings 185 defined at trailing end 205 of high pressure turbine section 112 to facilitate film cooling inner surface 138 and/or 140.

Second portion 172 of high pressure cooling air 170 is directed into low pressure turbine section active convection cooling zone 186 defined at least partially between shroud support 144 and shroud segment 130, and between midsection position control ring 162 and aft position control ring 164 to facilitate cooling low pressure turbine section 114. In one embodiment, second portion 172 of high pressure cooling air 170 is metered through a plurality of low pressure turbine feed holes 187 defined through shroud support 144. Second portion 172 of high pressure cooling air 170 is metered directly into low pressure turbine section active convection cooling zone 186 at least partially defining plenum 189 and plenum 191 to facilitate shroud segment impingement cooling in low pressure turbine section 114. Spent impingement cooling air 193 exits shroud segment 130 through cooling openings 194 defined at or near trailing edge 137 of shroud segment 130.

The shroud cooling assembly as shown in FIGS. 1 and 2 directs high pressure cooling air directly into high pressure turbine section active convection cooling zone 173 and/or low pressure turbine section active convection cooling zone 186 through respective feed hole(s) 174 and feed hole(s) 187.

In the shroud cooling assembly as shown in FIGS. 1 and 2, high pressure cooling air is not metered or directed through low pressure turbine section inactive convection cooling zone 211. As a result, the components defining low pressure turbine section inactive convection cooling zone 211 respond relatively slower to thermal conditions and/or environments during transient engine operation than the components defining an active convection cooling zone within conventional shroud cooling assemblies. This slower response to thermal conditions and/or environments facilitates relatively slower transient displacement of midsection position control ring 162 and/or aft position control ring 164.

Thus, by bypassing the low pressure turbine section shroud ring structure, the high pressure cooling air flow paths shown in FIGS. 1 and 2 facilitate reducing and/or retarding the transient thermal response and/or displacement of the shroud segment during transient engine operation. The slower response further facilitates improved blade tip clearance and turbine engine efficiency.

Figure 3:
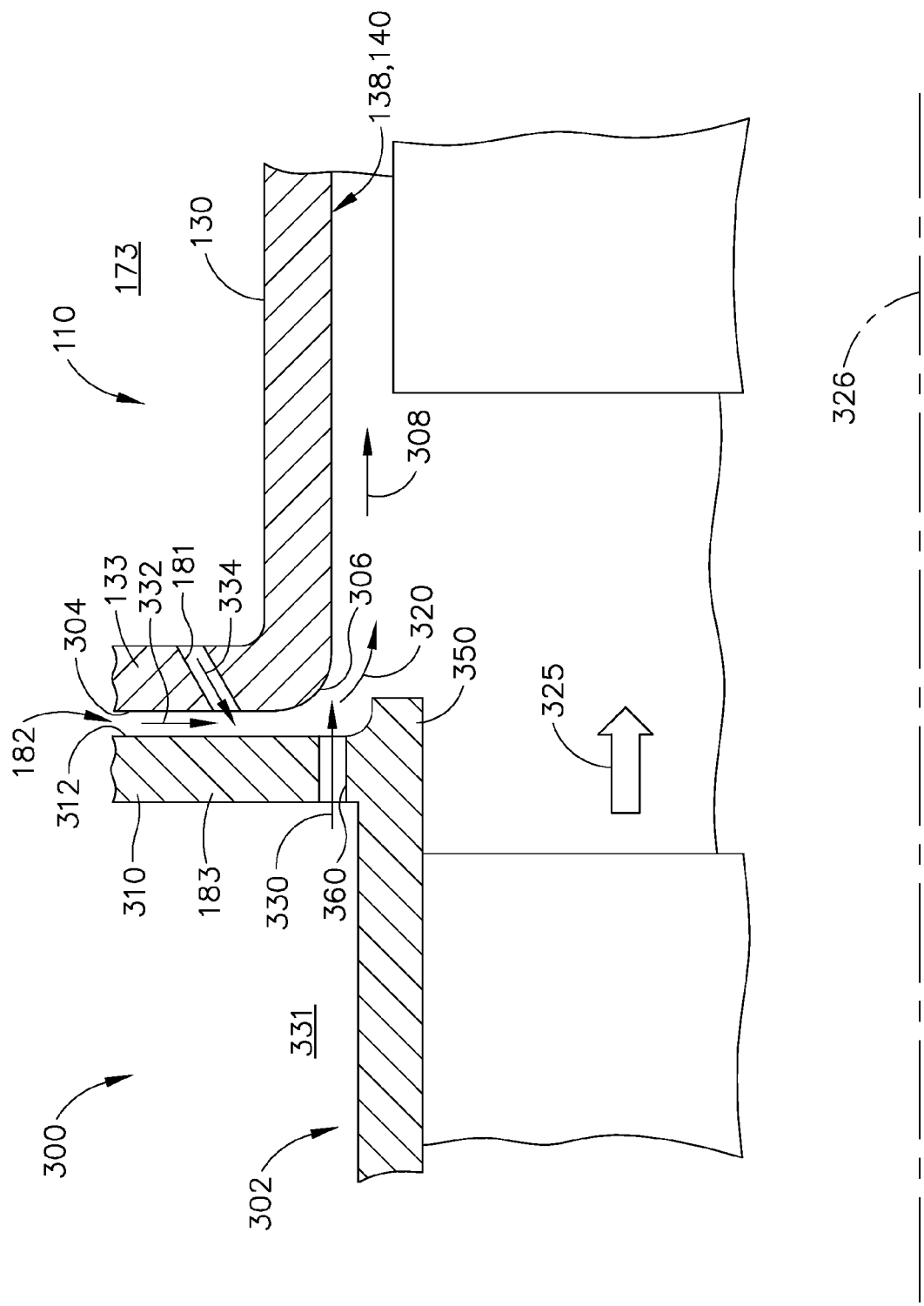
FIG. 3 is a schematic view of an exemplary turbine nozzle and shroud assembly.

FIG. 3 illustrates an exemplary turbine nozzle and shroud assembly 300. Shroud assembly 300 is similar to shroud assembly 110 (shown in FIGS. 1 and 2) and components of assembly 300 that are identical to components of assembly 110 are identified in FIG. 3 using the same reference numbers. Gap 182 is defined at an interface between the outer band 183 of upstream turbine nozzle 302 and a downstream adjacent shroud assembly 110 including shroud segment 130. In the exemplary embodiment, turbine nozzle 302 is positioned upstream of shroud segment 130 and is coupled to shroud segment 130 to form turbine nozzle and shroud assembly 300 for a gas turbine engine.

Shroud segment leading edge 133 defines a forward face 304 of shroud segment 130. In the exemplary embodiment, forward face 304 includes a rounded or arcuate corner portion 306 that partially defines gap 182. Moreover, corner portion 306 is configured to facilitate forming or developing a film cooling layer, generally represented by a direction arrow 308, at, adjacent to, or near an inner surface 138, 140 of shroud segment 130, as described in greater detail below.

Outer band 183 has a trailing edge 310 that defines an aft face 312 of outer band 183. When turbine nozzle 302 is coupled to shroud segment 130, gap 182 is defined between aft face 312 and forward face 304. Gap 182 enables cooling air 320 to flow radially inwardly toward a combustion gases or hot gas flow path that follows a generally axial direction represented by arrow 325. Hot gas flow path 325 flows generally parallel to a central axis 326 defined by the gas turbine engine. Cooling air 320 may include spent turbine nozzle cooling air 330 exiting a turbine nozzle active convection cooling zone 331 that is at least partially defined by outer band 183, leakage air 332 directed from a duct 204 (shown in FIG. 1) that is at least partially defined between turbine nozzle 302 and shroud assembly 110, including shroud segment 130, and/or shroud leading edge cooling air 334 exiting an active convection cooling zone 173 defined between shroud segment 130 and a cooperating shroud support 144 (shown in FIG. 1).

In the exemplary embodiment, a lip 350 is formed on aft face 312. More specifically, in the exemplary embodiment, lip 350 is positioned radially inwardly with respect to gap 182 and extends substantially rearward or downstream of gap 182. Lip 350 is configured to direct cooling air 320 along inner surface 138, 140 of shroud segment 130 to facilitate film cooling shroud segment 130. More specifically, lip 350 is configured to impinge cooling air 320 exiting gap 182 against lip 350, and to direct cooling air 320 toward inner surface 138, 140 of shroud segment 130 to facilitate film cooling shroud segment 130. Further, by extending axially downstream from gap 182, lip 350 enables gap 182 to be pressurized to facilitate a film cooling layer 308 being formed, or developed, at or near inner surface 138, 140, such that undesirable hot gas injection into gap 182 is facilitated to be limited.

In the exemplary embodiment, a plurality of discharge openings 360 are defined in aft face 312 of trailing edge 310. Discharge openings 360 are configured to meter the flow of spent turbine nozzle cooling air 330 into gap 182. As shown in FIG. 3, discharge openings 360 are oriented generally parallel to central axis 326 and/or to the hot gas flow path 325 flowing through the gas turbine engine. Discharge openings 360 are configured to direct spent turbine nozzle cooling air 330 towards corner portion 306 to facilitate forming film cooling layer 308. In the exemplary embodiment, discharge openings 360 are generally linearly aligned with inner surface 138, 140 of shroud segment 130.

Figure 4:
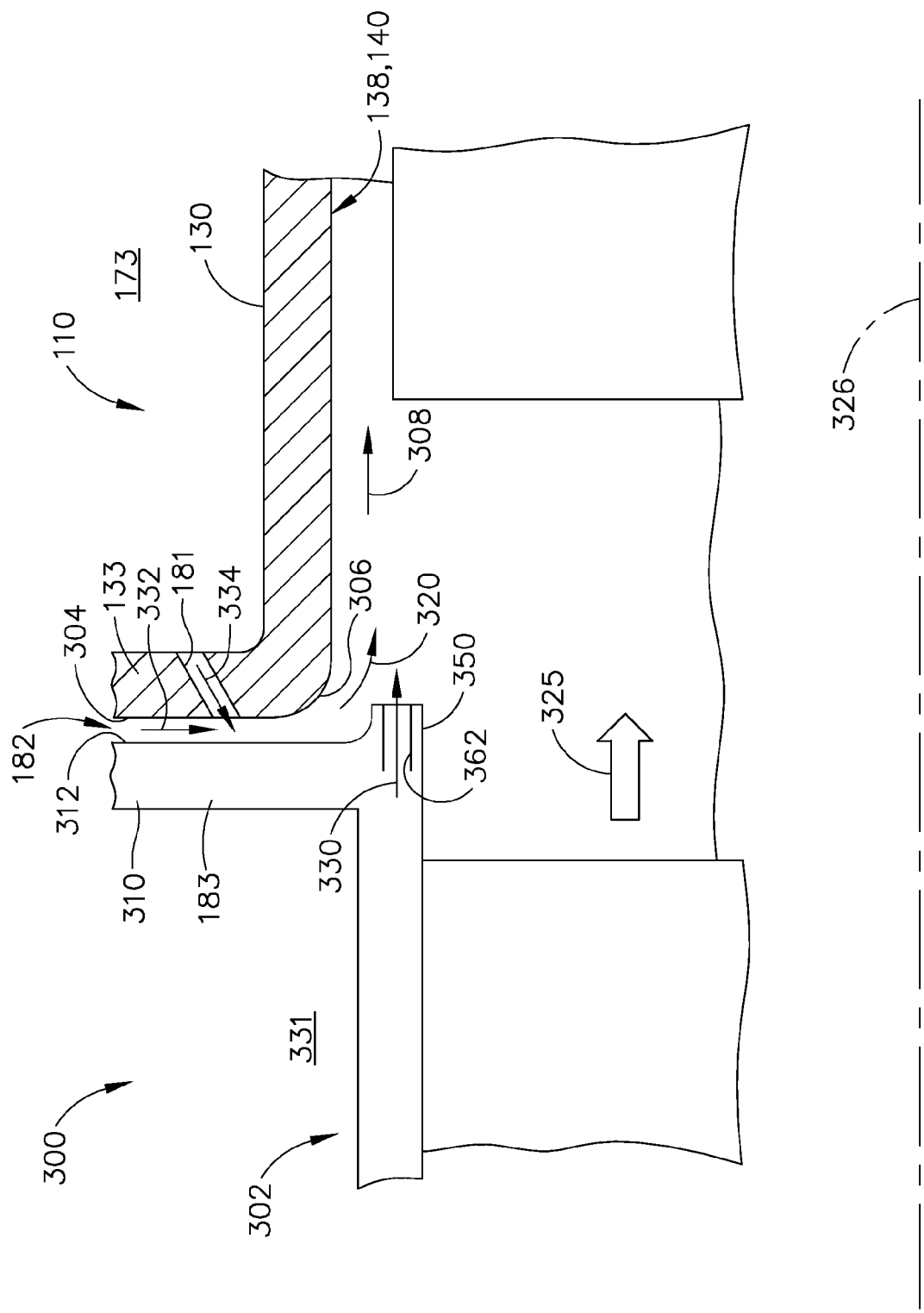
FIG. 4 is a schematic view of an alternative embodiment of a turbine nozzle and shroud assembly.

FIG. 4 illustrates an alternative embodiment turbine nozzle and shroud assembly 300. In the exemplary embodiment illustrated in FIG. 4 is substantially similar to the embodiment shown in FIG. 3. As such, components illustrated in FIG. 4 that are identical to components illustrated in FIG. 3 are identified in FIG. 4 using the same reference number used in FIG. 3. In the exemplary embodiment, a plurality of discharge openings 362 are defined in outer band trailing edge 310 and through lip 350. Discharge openings 362 are configured to meter the flow of spent turbine nozzle cooling air 330 through lip 350. As cooling air 320 exits gap 182, the cooling air 320 impinges against lip 350 and flows along rounded corner portion 306 to form or develop film cooling layer 308 at, adjacent to, or near inner surface 138, 140 of shroud segment 130 to facilitate film cooling of shroud segment 130. Spent turbine nozzle cooling air 330 exiting from discharge openings 362 formed in lip 350 facilitates shielding film cooling layer 308 formed along inner surface 140 from hot gas flow path 325. More specifically, spent turbine nozzle cooling air 330 facilitates forming a barrier between film cooling layer 308 and hot gas flow path 325. As shown in FIG. 4, in the exemplary embodiment, discharge openings 362 are defined within lip 350 generally parallel to hot gas flow path 325.

Referring to FIGS. 3 and 4, forwardly directed cooling openings 181 are defined in shroud segment leading edge 133 and are configured to meter a flow of shroud leading edge cooling air 334 into gap 182. In the exemplary embodiment, cooling openings 181 are radially outward from discharge openings 360 formed in aft face 312, as shown in FIG. 3, or discharge openings 362 extending through lip 350, as shown in FIG. 4. In one exemplary embodiment, at least one cooling opening 181 is substantially parallel with at least one discharge opening 360, 362. As shroud leading edge cooling air 334 exits cooling openings 181 into gap 182, cooling air 334 mixes with leakage air 332 directed from duct 204 (shown in FIG. 1). Mixed cooling air 320 impinges against lip 350 as cooling air 320 exits gap 182. Cooling air 320 then flows along rounded corner portion 306 to form or develop film cooling layer 308. In the exemplary embodiment, spent turbine nozzle cooling air 330 exiting discharge openings 360 through aft face 312, as shown in FIG. 3, is directed towards corner portion 306 to facilitate forming film cooling layer 308 on shroud segment inner surface 138. In an alternative embodiment, as shown in FIG. 4, spent turbine nozzle cooling air 330 exits discharge openings 362 formed in lip 350 to facilitate shielding film cooling layer 308 formed along inner surface 138, 140 from contact with hot gas flow path 325.

The above-described methods and systems facilitate film cooling a shroud segment. The methods and systems facilitate forming a barrier between the hot gas flow path flowing through the high pressure turbine and cooling air flowing through and exiting a gap defined between the turbine nozzle and the shroud segment. More specifically, cooling air flowing through the gap is directed to impinge against a lip extending from the trailing edge of the turbine nozzle. The lip is positioned radially inwardly with respect to the gap and extends axially downstream from the gap to direct post impingement cooling air towards a rounded corner portion formed on the leading edge of the shroud segment the corner facilitates forming or developing a film cooling layer at, near, or adjacent to, the inner surface of the shroud segment downstream of the gap. In the exemplary embodiment, spent turbine nozzle cooling air exiting the turbine nozzle outer band through discharge openings defined in the aft face directs cooling air exiting the gap towards the rounded corner portion to further facilitate forming or developing the film cooling layer. In an alternative embodiment, spent turbine nozzle cooling air exiting the turbine nozzle outer band through discharge openings defined in the lip facilitates shielding the film cooling layer from the hot gas flow path flowing through the gas turbine engine. As a result, the extended lip serves as a barrier between the hot gas flow path and the cooling air flowing through and exiting the gap defined between the outer band and the shroud segment. Further, the extended lip facilitates pressurizing the cooling air within the gap to prevent or limit hot gas injection into the gap due to nozzle trailing edge wake effect as may be seen in conventional cooling systems or assemblies.

Exemplary embodiments of methods and systems for film cooling a shroud segment are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A method for cooling a shroud segment of a gas turbine engine, said method comprising:
   providing a turbine shroud assembly including a shroud segment having a leading edge defining a forward face;
   coupling a turbine nozzle to the turbine shroud assembly such that a gap is defined between an aft face of an outer band of the turbine nozzle and the forward face, wherein a lip formed on the aft face is positioned radially inwardly with respect to the gap and extends substantially axially downstream from the gap;
   directing cooling air into the gap;
   impinging cooling air exiting the gap against the lip;
   directing post impingement cooling air at the forward face to facilitate forming a film cooling layer on the shroud segment; and
   shielding the film cooling layer from combustion gases flowing through the gas turbine engine.

2. A method in accordance with claim 1 further comprising pressurizing the gap to facilitate minimizing a turbine nozzle wake effect within the gap.

3. A method in accordance with claim 1 wherein shielding the film cooling layer from combustion gases further comprises metering a flow of cooling air through a plurality of discharge openings defined in the outer band.

4. A method in accordance with claim 3 wherein directing cooling air into the gap further comprises:
   directing cooling air through a plurality of forwardly directed cooling openings defined in the leading edge; and
   metering a flow of cooling air into the gap through the plurality of cooling openings.

5. A method in accordance with claim 1 wherein shielding the film cooling layer from combustion gases further comprises metering a flow of cooling air through a plurality of discharge openings extending through the lip and positioned radially inwardly with respect to the film cooling layer.

6. A method in accordance with claim 5 wherein metering a flow of cooling air through a plurality of discharge openings extending through the lip further comprises discharging cooling air through the plurality of discharge openings substantially parallel to the combustion gases flow path.

7. A method in accordance with claim 1 wherein directing cooling air into the gap further comprises metering a flow of cooling air into the gap through a plurality of forwardly directed cooling openings defined in the leading edge.

8. A method in accordance with claim 1 wherein directing cooling air into the gap further comprises directing leakage air into the gap from a duct that is at least partially defined by the turbine nozzle and the turbine shroud assembly.

9. A turbine nozzle and shroud assembly for a gas turbine engine, the gas turbine engine defining a central axis, said turbine nozzle and shroud assembly comprising:
   a shroud segment comprising a leading edge defining a forward face of said shroud segment;
   a turbine nozzle comprising an outer band having a trailing edge defining an aft face of said outer band, said turbine nozzle upstream from said shroud segment and coupled with said shroud segment such that a gap is defined between said aft face and said forward face, said gap is configured to direct cooling air towards combustion gases flowing through the gas turbine engine, said aft face comprises a lip formed therein radially inward with respect to said gap and extending axially downstream from said gap; and
   a plurality of discharge openings defined in said lip, said plurality of discharge openings configured to meter a flow of cooling air with respect to said gap.

10. A turbine nozzle and shroud assembly in accordance with claim 9 wherein said plurality of discharge openings are configured to facilitate shielding a film cooling layer formed on an inner surface of said shroud segment from the hot gas flow path.

11. A turbine nozzle and shroud assembly in accordance with claim 9 wherein said plurality of discharge openings are positioned radially inward with respect to a film cooling layer formed on an inner surface of said shroud segment.

12. A turbine nozzle and shroud assembly in accordance with claim 9 wherein said plurality of discharge openings extend substantially parallel to a central axis of the gas turbine engine, said plurality of discharge openings meter a flow of spent cooling air parallel to the hot gas flow path.

13. A turbine nozzle and shroud assembly in accordance with claim 9 further comprising a rounded corner portion formed on said leading edge, said rounded corner portion partially defines said gap and is configured to facilitate forming a film cooling layer on an inner surface of said shroud segment.

14. A turbine nozzle and shroud assembly in accordance with claim 9 further comprising a plurality of forwardly directed cooling openings defined in said leading edge, said plurality of cooling openings configured to meter a flow of edge cooling air into said gap.

15. A turbine nozzle and shroud assembly in accordance with claim 14 wherein at least one of said plurality of cooling openings is substantially parallel to at least one of said plurality of discharge openings defined in said lip.

16. A cooling system for a gas turbine engine, the gas turbine engine comprising a shroud segment having a leading edge defining a forward face, and a turbine nozzle comprising an outer band having a trailing edge defining an aft face, the turbine nozzle upstream of the shroud segment and coupled with the shroud segment such that a gap is defined between the aft face and the forward face, the aft face forming a lip radially inward with respect to the gap and extending substantially axially downstream from the gap, said cooling system configured to:

direct cooling air through the gap and radially inward towards combustion gases flowing through the gas turbine engine;

impinge cooling air exiting the gap against the lip to facilitate forming a film cooling layer along the shroud segment; and shield the film cooling layer from combustion gases.

17. A cooling system in accordance with claim 16 further configured to meter cooling air through a plurality of discharge openings defined in the outer band radially inward with respect to the film cooling layer.

18. A cooling system in accordance with claim 16 further configured to meter cooling air through a plurality of discharge openings extending through the lip radially inward with respect to the film cooling layer.

19. A cooling system in accordance with claim 18 wherein the plurality of discharge openings are configured to meter spent cooling air parallel to a combustion gases flow path.

20. A cooling system in accordance with claim 16 further configured to pressurize the gap to facilitate minimizing a turbine nozzle wake effect within the gap.

* * * * *